United States Patent
Cho et al.

(10) Patent No.: US 8,492,863 B2
(45) Date of Patent: Jul. 23, 2013

(54) OPTICAL MODULATOR

(75) Inventors: Yong-chul Cho, Suwon-si (KR);
Yong-tak Lee, Gwangju (KR);
Yong-hwa Park, Yongin-si (KR);
Byung-hoon Na, Seoul (KR);
Kwang-mo Park, Namwon-si (KR);
Chang-soo Park, Daejeon (KR)

(73) Assignees: Samsung Electronics Co., Ltd., Suwon-si (KR); Gwangju Institute of Science and Technology, Gwangju (KR)

( * ) Notice: Subject to any disclaimer, the term of this patent is extended or adjusted under 35 U.S.C. 154(b) by 281 days.

(21) Appl. No.: 12/938,064

(22) Filed: Nov. 2, 2010

(65) Prior Publication Data

US 2011/0181936 A1 Jul. 28, 2011

(30) Foreign Application Priority Data

Jan. 22, 2010 (KR) ................. 10-2010-0006052

(51) Int. Cl.
*H01L 27/14* (2006.01)
*G02F 1/07* (2006.01)

(52) U.S. Cl.
USPC ........... 257/431; 257/428; 257/429; 359/247; 359/248; 359/261; 359/262; 359/263; 359/315; 359/316; 359/317; 359/318

(58) Field of Classification Search
USPC .................. 257/428, 429, 431; 359/247, 248, 359/261–263, 315–318
See application file for complete search history.

(56) References Cited

U.S. PATENT DOCUMENTS

| | | | |
|---|---|---|---|
| 4,525,687 A | 6/1985 | Chemla et al. | |
| 4,935,616 A | 6/1990 | Scott | |
| 5,345,328 A | 9/1994 | Fritz et al. | |
| 5,426,312 A | 6/1995 | Whitehead | |
| 5,495,360 A * | 2/1996 | Yoo ............................. | 359/248 |

(Continued)

FOREIGN PATENT DOCUMENTS

| | | |
|---|---|---|
| JP | 2004-031925 A | 1/2004 |
| JP | 2008-098335 A | 4/2006 |

(Continued)

OTHER PUBLICATIONS

Communication dated Apr. 23, 2012 from the European Patent Office in counterpart European application No. 10194706.7.

(Continued)

*Primary Examiner* — Evelyn A. Lester
(74) *Attorney, Agent, or Firm* — Sughrue Mion, PLLC

(57) ABSTRACT

Optical modulator having wide bandwidth based on Fabry-Perot resonant reflection is disclosed. The optical modulator includes: a bottom Distributed Bragg Reflector (DBR) layer; a top DBR layer including at least one layer, and a modified layer; and an active layer disposed between bottom and top DBR layers, wherein the at least one layer includes at least one pair of a first refractive index layer having a first refractive index and a second refractive index layer having a second refractive index, the modified layer includes at least one pair of a third refractive index layer having a third refractive index and a fourth refractive index layer having a fourth refractive index, the third and the fourth refractive indexes being different, and at least one of the third and the fourth refractive index layers has a second optical thickness that is not $\lambda/4$ or that is not an odd multiple thereof.

29 Claims, 14 Drawing Sheets

U.S. PATENT DOCUMENTS

| | | | |
|---|---|---|---|
| 5,751,466 A * | 5/1998 | Dowling et al. | 359/248 |
| 5,909,303 A | 6/1999 | Trezza et al. | |
| 6,028,693 A * | 2/2000 | Fork et al. | 359/248 |
| 6,088,086 A | 7/2000 | Muguira et al. | |
| 6,154,299 A | 11/2000 | Gilbreath et al. | |
| 6,331,911 B1 | 12/2001 | Manassen et al. | |
| 6,396,617 B1 * | 5/2002 | Scalora | 359/248 |
| 6,483,094 B1 | 11/2002 | Yahav et al. | |
| 6,744,552 B2 | 6/2004 | Scalora et al. | |
| 6,856,355 B1 | 2/2005 | Ray et al. | |
| 7,067,853 B1 | 6/2006 | Yao | |
| 7,339,968 B2 | 3/2008 | Coleman et al. | |
| 7,369,595 B2 | 5/2008 | Kim et al. | |
| 8,194,303 B2 * | 6/2012 | Park et al. | 359/263 |
| 2002/0135853 A1 * | 9/2002 | Scalora | 359/248 |

FOREIGN PATENT DOCUMENTS

| | | |
|---|---|---|
| JP | 2008-078615 A | 4/2008 |
| JP | 2009-182210 A | 8/2009 |
| KR | 10-0794667 B1 | 1/2008 |
| WO | 95/06272 A1 | 3/1995 |

OTHER PUBLICATIONS

Timofeev et al., "Application of anodic oxidation for postgrowth tailoring of InGaAsP/InP asymettric Fabry-Perot modulator reflection spectra," Electronics Letters, IEE Stevenage, GB, vol. 31, No. 14, Jul. 6, 1995, pp. 1186-1187.

Karim et al., "Post-growth tuning of inverted cavity InGaAa/AlGaAs spatial light modulators using phase compensating dielectric mirrors," Applied Physics Letters, AIP, American Inst. of Physics, Melville, NY, USA, vol. 66, No. 21, May 22, 1995, pp. 2774-2776.

Liu et al., "Vertical cavity modulator for optical interconnection and its high speed performance," Proceedings of SPIE, SPIE, USA, vol. 3952, Jan. 1, 2000, pp. 234-241.

Yan et al., "Surface-normal Electroabsorption reflection modulators using asymettric Fabry-Perot structures," IEEE Journal of Quantum Electronics, IEEE Service Center, Piscataway, NJ, USA, vol. 27, No. 7, Jul. 1, 1991, pp. 1922-1931.

Heinol, H.G., et al., "Electro-Optical Correlation arrangement for Fast 3-D Cameras: Properties and Facilities of the Electro-Optical Mixer Device", SPIE, vol. 3100, 1997.

Gryshchenko, S.V., et al., "Theoretical Study of the Quantum Efficiency of InGaAS/GaAs Resonant Cavity Enhanced Photodetectors", Proceeding of the Optics and High Technology Material Science Conference, p. 125, Oct. 2006.

Xu, M.G., et al., Wide Optical Bandwidth Asymmetric Fabry-Perot Reflection Modulator Using the Quantum Confined Start Effect, Journal of Applied Physics, vol. 84, No. 10, pp. 5761-5765, Nov. 15, 1998.

Goossen, K.W., Electroabsorption in Ultranarrow-Barrier GaAs/AlGaAs Multiple Quantum Well Modulators, Applied Physics Lett., vol. 64, pp. 1071, Feb. 28, 1994.

Conroy, Richard M., Range Imager Performance Comparison in Homodyne and Heterdyne Operating Modes, SPIE-IS-T, vol. 7239., 2009.

Goossen, K.W., et al., Stacked-Diode Electroabsorption Modulator, IEEE Photonics Technology Letters, vol. 6, No. 8, pp. 936-938, Aug. 1994.

* cited by examiner

FIG. 3

| | MATERIAL | THICK. | NOTE | REGION |
|---|---|---|---|---|
| 105 | GaAs | 100 Å | | P-contact |
| 133 { 136 | Al$_{0.5}$Ga$_{0.5}$As | 640 Å | p=1 PAIR | TOP DBR |
| 133 { 135 | AlAs | 705 Å | | |
| 132 { 138 | Al$_{0.5}$Ga$_{0.5}$As | 512 Å | MODIFIED DBR | |
| 132 { 137 | AlAs | 775.5 Å | | |
| 131 { 136 | Al$_{0.5}$Ga$_{0.5}$As | 640 Å | Q=0 PAIR | TOP DBR |
| 131 { 135 | AlAs | 705 Å | | |
| 126 | Al$_{0.5}$Ga$_{0.5}$As | 100 Å | | CLADDING |
| 125 | AlAs | 270 Å | | |
| 123 | GaAs | 90 Å | 34 PAIRS | ACTIVE (MQW) (2λ) |
| 124 | AlAs | 30 Å | | |
| 123 | GaAs | 90 Å | | |
| 122 | AlAs | 270 Å | | CLADDING |
| 121 | Al$_{0.5}$Ga$_{0.5}$As | 100 Å | | |
| 113 | AlAs | 705 Å | 21 PAIRS | BOTTOM DBR |
| 112 | Al$_{0.5}$Ga$_{0.5}$As | 640 Å | | |
| 111 | AlAs | 705 Å | | PHASE MATCHING LAYER |
| 102 | n-GaAs CONTACT LAYER | | | |
| 101 | GaAs SUBSTRATE | | | |

FIG. 6

| | MATERIAL | THICK. | NOTE | REGION |
|---|---|---|---|---|
| 105 | GaAs | 100 Å | | P-CONTACT |
| 133 { 136 | $Al_{0.5}Ga_{0.5}As$ | 640 Å | p=2 PAIRS | TOP DBR |
| 133 { 135 | AlAs | 705 Å | | |
| 132 { 138 | $Al_{0.5}Ga_{0.5}As$ | 256 Å | MODIFIED DBR | |
| 132 { 137 | AlAs | 422 Å | | |
| 131 { 136 | $Al_{0.5}Ga_{0.5}As$ | 640 Å | q=10 PAIRS | TOP DBR |
| 131 { 135 | AlAs | 705 Å | | |
| 149 | $Al_{0.5}Ga_{0.5}As$ | 100 Å | | Cladding |
| 148 | AlAs | 270 Å | | |
| 140a { 147 | GaAs | 90 Å | 17 PAIRS | FIRST MQW |
| 140a { 146 | AlAs | 30 Å | | |
| 140b { 145 | GaAs | 80 Å | 17 PAIRS | SECOND MQW |
| 140b { 144 | AlAs | 30 Å | | |
| 140b { 143 | GaAs | 80 Å | ADDITIONAL WELL | |
| 142 | AlAs | 270 Å | | CLADDING |
| 141 | $Al_{0.5}Ga_{0.5}As$ | 100 Å | | |
| 113 | AlAs | 705 Å | 21 PAIRS | BOTTOM DBR |
| 112 | $Al_{0.5}Ga_{0.5}As$ | 640 Å | | |
| 111 | AlAs | 705 Å | | PHASE MATCHING LAYER |
| 102 | n-GaAs CONTACT LAYER | | | |
| 101 | GaAs SUBSTRATE | | | |

$V_{in} = V_A \sin(wt)$

OPTICAL MODULATOR

CROSS-REFERENCE TO RELATED APPLICATIONS

This application claims the benefit of Korean Patent Application No. 10-2010-0006052, filed on Jan. 22, 2010, in the Korean Intellectual Property Office, the disclosure of which is incorporated herein in its entirety by reference.

BACKGROUND

1. Field

Exemplary embodiments of the present disclosure relate to optical modulators, and more particularly, to optical modulators having a wide bandwidth based on Fabry-Perot resonant reflection.

2. Description of the Related Art

An image captured by a general camera does not include distance information. In order to realize a 3-dimensional (3D) camera, each pixel in an image sensor of the 3D camera must provide distance information. Accordingly, a unit for measuring a distance from a plurality of points on a surface of an object to the 3D camera is required.

Distance information about an object is generally obtained by using a binocular stereovision method using two cameras or a triangulation method using a structured light and a camera. However, according to the two methods, the accuracy of the distance information is sharply reduced when a distance between an object and a camera increases. Also, these methods are dependent on a surface state of the object, and thus precise distance information may not be obtained.

Accordingly, a time-of-flight (TOF) method has been introduced. The TOF method irradiates a laser beam on an object, and measures TOF of light until the light is received by a light receiver after being reflected off the object. According to the TOF method, a light having a certain wavelength, such as near infrared rays of 850 nm, is projected onto the object by using a light emitting diode (LED) or a laser diode (LD), the light receiver receives a light having the same wavelength and reflected from the object, and then particular processes are performed to extract distance information. Different TOF methods may be used based on the series of particular processes.

For example, an image reflected from an object may be optically modulated by using an image intensifier or another solid modulator device, and then the optically-modulated image may be captured by using an image sensor to obtain distance information based on an intensity value. Here, a super-high optical modulation speed of tens to hundreds of MHz is required to identify a phase difference or TOF of a light according to distance. Accordingly, various types of optical modulators, such as an image intensifier including a multi-channel plate (MCP), a thin modulator device using an electro-optic (EO) material, and a gallium arsenide (GaAs)-based solid modulator device, have been suggested.

The image intensifier includes a photocathode for converting a light into electrons, a MCP for amplifying the number of electrons, and a phosphor for converting the electrons back to the light. However, the image intensifier occupies a large volume, and is expensive since a high voltage of several kV is used. Also, the thin modulator device using the EO material uses a refractive index change of a nonlinear crystalline material according to a voltage as an operating principle. Such a thin modulator device using the EO material is thick and also requires a high voltage.

Recently, a GaAs semiconductor-based modulator that is easily manufactured, small, and operable with a low voltage has been suggested. The GaAs semiconductor-based modulator includes a multiple quantum well (MQW) layer between a P-electrode and an N-electrode, and uses a phenomenon of the MQW layer absorbing light when a reverse bias voltage is applied to the P- and N-electrodes. However, a bandwidth of a modulator of the GaAs semiconductor-based optical modulator is about 4 nm to about 5 nm, which is very narrow.

SUMMARY

Provided are optical modulators having an optical modulation characteristic of a wide bandwidth.

Additional aspects will be set forth in part in the description which follows and, in part, will be apparent from the description, or may be learned by practice of the presented exemplary embodiments.

According to an aspect of the present exemplary embodiment, an optical modulator includes: a bottom Distributed Bragg Reflector (DBR) layer; a top DBR layer including at least one layer, and a modified layer; and an active layer disposed between the bottom and the top DBR layers and including multiple quantum wells (MQW), wherein the at least one layer includes at least one pair of a first refractive index layer having a first refractive index and a second refractive index layer having a second refractive index, each of the first and the second refractive index layers having a first optical thickness of $\lambda/4$ or an odd multiple thereof and the first and the second refractive indexes being different, wherein the modified layer includes at least one pair of a third refractive index layer having a third refractive index and a fourth refractive index layer having a fourth refractive index, the third and the fourth refractive indexes being different, and wherein $\lambda$ is a center absorption wavelength in the active layer and at least one of the third and the fourth refractive index layers have a second optical thickness that is not $\lambda/4$ or that is not an odd multiple thereof.

The first and the third refractive index layers may include a same material and the first and the second optical thicknesses are different.

The same material may include AlAs.

The second and the fourth refractive index layers may include a same material and the first and the second optical thicknesses are different.

The same material may include $Al_{0.5}Ga_{0.4}As$.

The first refractive index layer may include a first refractive index material, and the third refractive index layer may include a third refractive index material that is different from the first refractive index material.

The first refractive index layer material may include AlAs and the third refractive index layer material may include $Al_{0.9}Ga_{0.1}As$.

The second refractive index layer may include a second refractive index layer material, and the fourth refractive index layer may include a fourth refractive index layer material that is different from the second refractive index material.

The second refractive index layer material may include $Al_{0.5}Ga_{0.7}As$ and the fourth refractive index layer material may include $Al_{0.3}Ga_{0.7}As$.

The at least one layer of the top DBR layer may include a first layer and a second layer, wherein the first layer may be disposed on the modified layer and may include at least one first pair of the first and the second refractive index layers, and the second layer may be disposed below the modified layer and may include at least one second pair of the first and the second refractive index layers.

The number of the at least one first pair may be different from the number of the at least one second pair.

The modified layer may include a plurality of pairs of the third and fourth refractive index layers; and wherein the at least one layer may be disposed on the modified layer and may include a plurality of pairs of the first and the second refractive index layers.

The active layer may include at least two types of quantum well layers having different thicknesses.

The active layer may include a first MQW and a second MQW which are stacked, wherein the first MQW may include a plurality of pairs of a first quantum well layer and a first barrier layer, the second MQW may include a plurality of pairs of a second quantum well layer and a second barrier layer, and the first and the second quantum well layers have different thicknesses.

The first and the second quantum well layers may include a same material.

The same material may include GaAs.

In some embodiments, a total thickness of the active layer may be substantially identical to an integer multiple of the center absorption wavelength.

The active layer may include a structure in which a pair of a first quantum well layer and a first barrier layer and a pair of a second quantum well layer and a second barrier layer are stacked, wherein the first and the second quantum well layers may include a same material and have different thicknesses.

The optical modulator may further include a first contact layer disposed below the bottom DBR layer; a substrate disposed below the first contact layer; and a second contact layer disposed on the top DBR layer.

The optical modulator may further include an electrode formed on the second contact layer, wherein the electrode has a lattice shape.

The first contact layer may be partially formed on a surface of the substrate, and the bottom DBR layer, the active layer, the top DBR layer, and the second contact layer may be partially formed on a surface of the first contact layer.

The optical modulator may further include an insulating layer disposed on the substrate and the first contact layer, at two sides of the bottom DBR layer, the active layer, the top DBR layer, and the second contact layer.

The optical modulator may further include a trench which exposes the first contact layer from one of the insulating layers at two sides of the bottom DBR layer, the active layer, the top DBR layer, and the second contact layer.

The optical modulator may further include an electrode formed on the first contact layer in the trench; and a metal wire extending along an inner wall of the trench and a surface of the insulating layer, to be connected to the electrode.

The bottom DBR layer may be more reflective than the top DBR layer.

According to another aspect of the present exemplary embodiment, an optical modulator device including the above mentioned optical modulator is provided, wherein the optical modulator may serve as an optical modulator cell of a plurality of optical modulator cells, wherein the plurality of optical modulator cells may be arranged in an array.

The plurality of optical modulator cells may be separated from an adjacent optical modulator cell by a trench.

The optical modulator device may further include a plurality of drivers correspondingly disposed for the plurality of optical modulator cells.

According to another aspect of the present exemplary embodiment, an optical modulator includes: an active layer including multiple quantum wells; a first Distributed Bragg Reflector (DBR) layer disposed to one side of the active layer; and a second DBR layer disposed to another side of the active layer, the second DBR layer being less reflective than the first DBR layer, wherein the second DBR layer includes: a first layer including a plurality of first refractive index layers and a plurality of second refractive index layers, the plurality of first refractive index layers being alternatingly disposed with the plurality of second refractive index layers; a modified layer including at least one pair of layers; and a second layer including another plurality of the first refractive index layers and another plurality of second refractive index layers, the another plurality of first refractive index layers being alternatingly disposed with the another plurality of second refractive index layers; and wherein λ is a center absorption wavelength in the active layer, wherein each of the plurality of first refractive index layers and each of the plurality of second refractive index layers has an optical thickness of λ/4 or an odd multiple thereof, and wherein the at least one pair of layers of the modified layer has an optical thickness that is not λ/4 or that is not an odd multiple thereof.

BRIEF DESCRIPTION OF THE DRAWINGS

These and/or other aspects will become apparent and more readily appreciated from the following description of the exemplary embodiments, taken in conjunction with the accompanying drawings of which:

FIG. 3 is a table showing structures and thicknesses of layers of an optical modulator, according to an exemplary embodiment;

FIG. 6 is a table showing structures and thicknesses of layers of the optical modulator of FIG. 5, according to an exemplary embodiment;

DETAILED DESCRIPTION

Figure 1:
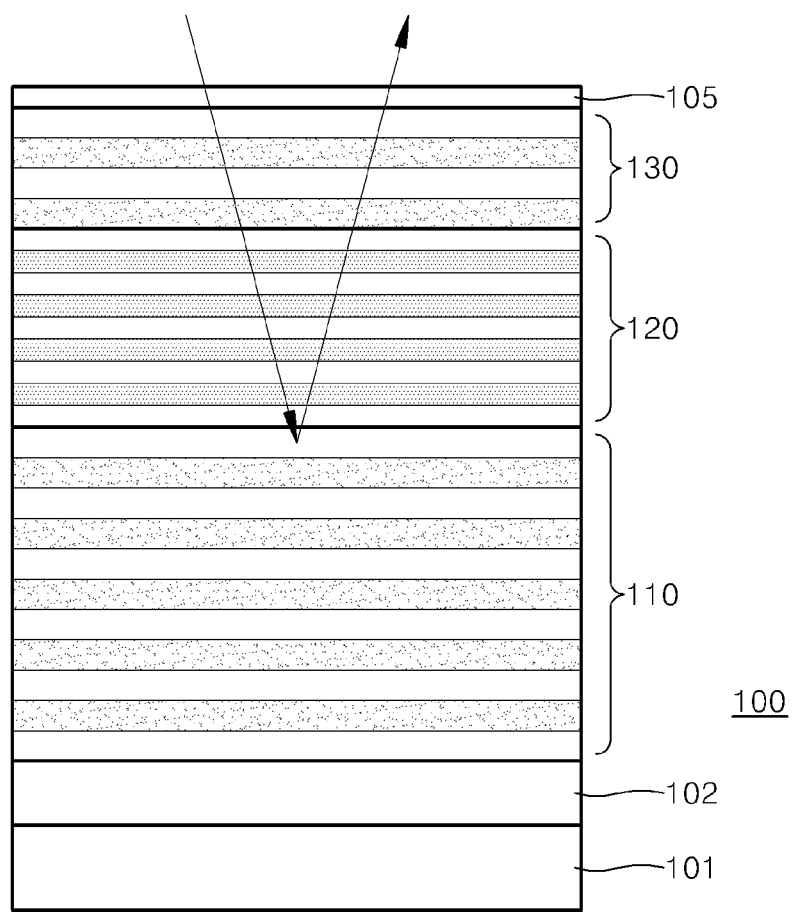
FIG. 1 is a cross-sectional view schematically illustrating an optical modulator according to an exemplary embodiment.

Reference will now be made in detail to exemplary embodiments, examples of which are illustrated in the accompanying drawings, wherein like reference numerals refer to the like elements throughout, and sizes of each element may be exaggerated for clarity. In this regard, the present exemplary embodiments may have different forms and should not be construed as being limited to the descriptions set forth herein. Accordingly, the exemplary embodiments are merely described below, by referring to the figures, to explain aspects of the present description.

FIG. 1 is a cross-sectional view schematically illustrating an optical modulator 100 according to an exemplary embodiment. Referring to FIG. 1, the optical modulator 100 includes a first contact layer 102, a bottom distributed Bragg reflector (DBR) layer 110, an active layer 120 having a multiple quantum well, a top DBR layer 130, and a second contact layer 105 which are sequentially stacked on a substrate 101 in the stated order. Here, the first contact layer 102 may be an N-type contact layer, and the second contact layer 105 may be a P-type contact layer. In this case, the bottom DBR layer 110 is also doped with an N-type dopant and the top DBR layer 130 is doped with a P-type dopant. For the sake of simplicity, other components of the optical modulator 100 such as electrodes, wires, etc., are not shown in FIG. 1.

When a reverse bias voltage is applied to the optical modulator 100 having such a structure, an incident light is absorbed in the active layer 120 by electroabsorption. Also, the bottom DBR layer 110 and the top DBR layer 130 form a Fabry-Perot resonator. Accordingly, the optical modulator 100 of FIG. 1 may be an asymmetric Fabry-Perot modulator (AFPM) based on electroabsorption.

The optical modulator 100 may be reflective. When the optical modulator 100 is reflective, the optical modulator 100 modulates light that is incident from an upper direction and outputs the light again to the upper direction. Here, the bottom and top DBR layers 110 and 130 each operate as a mirror having high reflectivity and include a pair of material layers having different refractive indexes. In other words, the bottom and top DBR layers 110 and 130 each have a structure in which a layer having a relatively low refractive index and a layer having a relatively high refractive index are repeatedly and alternatingly stacked, i.e., interleavingly stacked. For example, the bottom and top DBR layers 110 and 130 may each have a structure in which an AlAs layer and an $Al_{0.5}Ga_{0.5}As$ layer or an $Al_{0.9}Ga_{0.1}As$ layer and an $Al_{0.3}Ga_{0.7}As$ layer are repeatedly and alternatingly stacked. In an alternative embodiment, $Al_xGa_{1-x}As$ is used, where x is an integer. When a light having a predetermined wavelength is incident on the bottom or top DBR layer 110 or 130 having such a structure, the light is reflected at an interface of the two material layers of the bottom or top DBR layer 110 or 130. Here, high reflectivity is obtained by adjusting a phase difference of all reflected lights to be the same. Accordingly, optical thicknesses of each of the two material layers of the bottom or top DBR layer 110 or 130 are set to be $\lambda/4$ or an odd multiple of $\lambda/4$, wherein the optical thickness is obtained by multiplying a refractive index of the corresponding material to a physical thickness, and denotes a wavelength of incident light. The reflectivity of the bottom or top DBR layer 110 or 130 is increased as the number of repeating pairs of material layers is increased.

A total optical thickness of the active layer 120 is configured to be identical to an integer multiple of a wavelength of the incident light. Consequently, only an incident light having a predetermined wavelength resonates between the bottom and top DBR layers 110 and 130 and is absorbed in the active layer 120. The bottom DBR layer 110 has high reflectivity of at least about 99% so that absorption in the active layer 120 is maximized. On the other hand, the top DBR layer 130 may have a relatively low reflectivity, for example, from about 30% to about 60%, so that the light is incident on the active layer 120 as much as possible while resonating in the active layer 120.

Meanwhile, in the optical modulator 100 of FIG. 1, a part of the top DBR layer 130 may be modified so that differences between reflectivity when a reverse voltage is applied and reflectivity when a reverse voltage is not applied are similar in a wide wavelength domain, i.e., has a wide bandwidth. As described above, the bottom and top DBR layers 110 and 130 each have pairs of material layers, each of the material layers having an optical thickness of $\lambda/4$ or an odd multiple thereof. Here, the optical thickness of a part of the material layer of the top DBR layer 130 may be configured to be different from $\lambda/4$ or an odd multiple thereof. Accordingly, a light having a wavelength different from a certain design wavelength may be incident on the active layer 120. As a result, the active layer 120 may absorb light in a wider spectrum domain.

Figure 2:
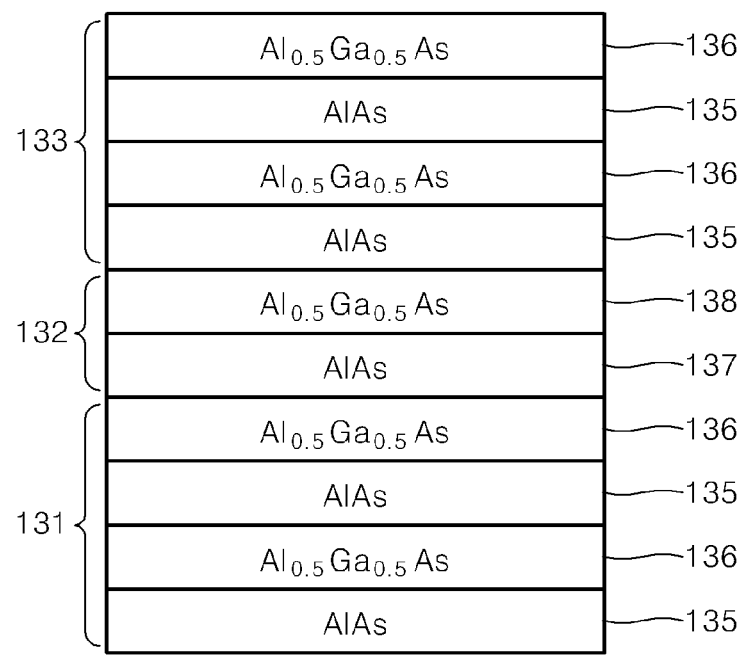
FIG. 2 is a cross-sectional view illustrating a structure of a top distributed Bragg reflector (DBR) layer of an optical modulator.

FIG. 2 is a cross-sectional view illustrating an exemplary structure of a top DBR layer. Referring to FIG. 2, the top DBR layer 130 may include a first top DBR layer 131 including pairs of a first refractive index layer 135 and a second refractive index layer 136, a modified DBR layer 132 including a pair of a third refractive index layer 137 and a fourth refractive index layer 138, and a second top DBR layer 133 including pairs of the first refractive index layer 135 and the second refractive index layer 136. The number of pairs of the first refractive index layer 135 and the second index layer 136 in each of the first top DBR layer 131 and the second top DBR layer 133 may vary as needed. Likewise, the number of pairs of the third refractive index layer 137 and the fourth refractive index layer 138 in the modified DBR layer 132 may also vary as needed. Here, the first refractive index layer 135 may be formed of AlAs that has a relatively low refractive index, and the second refractive index layer 136 may be formed of $Al_{0.5}Ga_{0.5}As$ that has a relatively high refractive index. Optical thicknesses of each of the first refractive index layer 135 and the second refractive index layer 136 are ¼ of a wavelength of a light to be incident, i.e. $\lambda/4$, or an odd multiple of ¼ of the wavelength of the light to be incident (hereinafter "odd multiple").

A part of the modified DBR layer 132, i.e., the third refractive index layer 137, may be formed of the same material (AlAs) as the first refractive index layer 135, and the fourth refractive index layer 138 may be formed of the same material ($Al_{0.5}Ga_{0.5}As$) as the second refractive index layer 136. However, an optical thickness of at least one of the third and fourth refractive index layers 137 and 138 is different from $\lambda/4$ or the odd multiple. For example, only the third refractive index layer 137 may have an optical thickness different from $\lambda/4$ or the odd multiple, only the fourth refractive index layer 138 may have an optical thickness different from $\lambda/4$ or the odd multiple, or both the third and fourth refractive index layers 137 and 138 may have optical thicknesses different from $\lambda/4$ or the odd multiple. Also, in order to modify an optical thickness, a material having a refractive index different from that of the first or second refractive index layer 135 or 136 may be used. For example, the third refractive index layer 137 may be formed of $Al_{0.9}Ga_{0.1}As$ instead of AlAs, and the fourth refractive index layer 138 may be formed of $Al_{0.3}Ga_{0.7}As$ instead of $Al_{0.5}Ga_{0.5}As$. In another exemplary embodiment, one or both of the third and fourth refractive index layers 137 and 138 may be formed of a different material. In this case, the optical thicknesses of the third and fourth refractive index layers 137 and 138 may be determined according to a wavelength and bandwidth to be absorbed.

In FIG. 2, the modified DBR layer 132 is disposed in the middle of the top DBR layer 130, but according to an alternative exemplary embodiment, the first top DBR layer 131 or the second top DBR layer 133 may be omitted.

FIG. 3 is a table showing exemplary structures and thicknesses of layers of an optical modulator, according to an exemplary embodiment. The optical modulator 100 according to the current exemplary embodiment is designed to have a center absorption wavelength of about 850 nm by using a GaAs compound semiconductor. Referring to FIG. 3, the second contact layer 105 operating as a p-contact layer is formed of p-GaAs. A GaAs material has a low oxidation rate and a small band gap, and thus is useful to form an Ohmic contact while forming an electrode. The thickness of the second contact layer 105 is about 10 nm considering absorption loss of incident light.

The top DBR layer 130 is disposed below the second contact layer 105. The top DBR layer 130 includes a pair of an $Al_{0.5}Ga_{0.5}As$ material and an AlAs material having different refractive indexes. In order for a small number of layers to obtain high reflectivity without absorbing incident light, a band gap of a material used to form a DBR layer may be large, and a difference between refractive indexes of two different materials may be big. Generally, when Al is added to GaAs, a band gap increases and a refractive index decreases. For example, a refractive index of $Al_{0.5}Ga_{0.5}As$ is about 3.316 and a refractive index of AlAs is about 3.00. As shown in FIG. 3, the second top DBR layer 133 of the top DBR layer 130 includes only one pair (p=1 pair) of the first refractive index layer 135 and the second refractive index layer 136. The optical thickness (70.5 nm×3.00) of the first refractive index layer 135 formed of AlAs satisfies $\lambda/4$ (850 nm/4=212.5 nm). Also, the optical thickness (64 nm×3.316) of the second refractive index layer 136 formed of $Al_{0.5}Ga_{0.5}As$ satisfies $\lambda/4$ (212.5 nm). The modified DBR layer 132 below the second top DBR layer 133 includes only one pair of the third refractive index layer 137 and the fourth refractive index layer 138. The third refractive index layer 137 is also formed of AlAs like the first refractive index layer 135, but the optical thickness (77.55 nm×3.00=232.65 nm) of the third refractive index layer 137 is about 1.1 times greater than $\lambda/4$. Similarly, the fourth refractive index layer 138 is also formed of $Al_{0.5}Ga_{0.5}As$ like the second refractive index layer 136, but the optical thickness (51.2 nm×3.316=169.78 nm) of the fourth refractive index layer 138 is about 0.8 times greater than $\lambda/4$. In FIG. 3, the first top DBR layer 131 is not included, as the number of pairs of the first refractive index layer 135 and the second refractive index layer 136 is zero (Q=0 pair). In other words, the top DBR layer 130 includes the modified DBR layer 132 and the second top DBR layer 133 on the modified DBR layer 132.

The active layer 120 includes a plurality of quantum well layers 123 for absorbing light, and a barrier layer 124 for preventing electron transfer between the quantum well layers 123. In FIG. 3, the quantum well layer 123 has a thickness of 9 nm and is formed of GaAs, and the barrier layer 124 has a thickness of 3 nm and is formed of AlAs. The active layer 120 has a multiple quantum well (MQW) structure having 34 pairs of the quantum well layer 123 and the barrier layer 124. In this case, the total thickness of the active layer 120 is twice (2$\lambda$) the center absorption wavelength. Generally, the thickness of the active layer 120 is an integer multiple (m$\lambda$) of the center absorption wavelength. When the active layer 120 is thin (m=1), a voltage drop is decreased but light absorption also decreases, and on the other hand, when the active layer 120 is thick (m=3), a high reverse bias voltage is required and absorptivity is increased. Considering such characteristics, the thickness of the active layer 120 of FIG. 3 is adjusted to be twice the center absorption wavelength (m=2).

A top cladding layer including an AlAs layer 125 and an $Al_{0.5}Ga_{0.5}As$ layer 126 is disposed between the active layer 120 and the top DBR layer 130, and a bottom cladding layer including an $Al_{0.5}Ga_{0.5}As$ layer 121 and an AlAs layer 122 is disposed between the active layer 120 and the bottom DBR layer 110. Generally, when the top DBR layer 130 is formed, $Al_{0.5}Ga_{0.5}As$ having a high refractive index is disposed before AlAs having a low refractive index with respect to an incident direction of light, in order to increase reflectivity. However, in order to minimize light loss when the light is resonated in the active layer 120, the active layer 120 is configured such that the light may move from a layer having a low refractive index, for example, a layer formed of AlAs and having a refractive index of 3.00, to a layer having a high refractive index, for example, a layer formed of GaAs and having a refractive index of 3.702, between the top DBR layer 130 and the bottom DBR layer 110.

The bottom DBR layer 110 includes 21 pairs of a first refractive index layer 112 and a second refractive index layer 113 so as to obtain high reflectivity of at least 99%. The first refractive index layer 112 is formed of $Al_{0.5}Ga_{0.5}As$ and the second refractive index layer 113 is formed of AlAs. An optical thickness of each of the first and second refractive index layers 112 and 113 is $\lambda/4$. A phase matching layer 111 is disposed between the bottom DBR layer 110 and the first contact layer 102. Here, the phase matching layer 111 is formed of AlAs having a low refractive index considering an order of refractive indexes, because $Al_{0.5}Ga_{0.5}As$ having a high refractive index is disposed at the bottom of the bottom DBR layer 110, and the substrate 101 formed of GaAs and having a refractive index of 3.702 is disposed below the $Al_{0.5}Ga_{0.5}As$. The first contact layer 102 formed of n-GaAs and the substrate 101 formed of GaAs are sequentially disposed below the phase matching layer 111 in the order stated.

Meanwhile, the bottom and top DBR layers 110 and 130 also operate as a path through which a current flows, aside from operating as a mirror. Accordingly, the $Al_{0.5}Ga_{0.5}As$ and AlAs layers included in the bottom and top DBR layers 110 and 130 may be conductive. When the bottom and top DBR layers 110 and 130 are doped with a dopant, conductivity generally increases in proportion to the concentration of the dopant, but when the concentration of the dopant increases, optical characteristics are deteriorated. For example, Be may be used as a dopant for a P-type material, and Si may be used as a dopant for an N-type material. The concentration of the dopant may be about $1\times10^{18}$ cm$^{-2}$ to $3\times10^{18}$ cm$^{-2}$.

Figure 4:
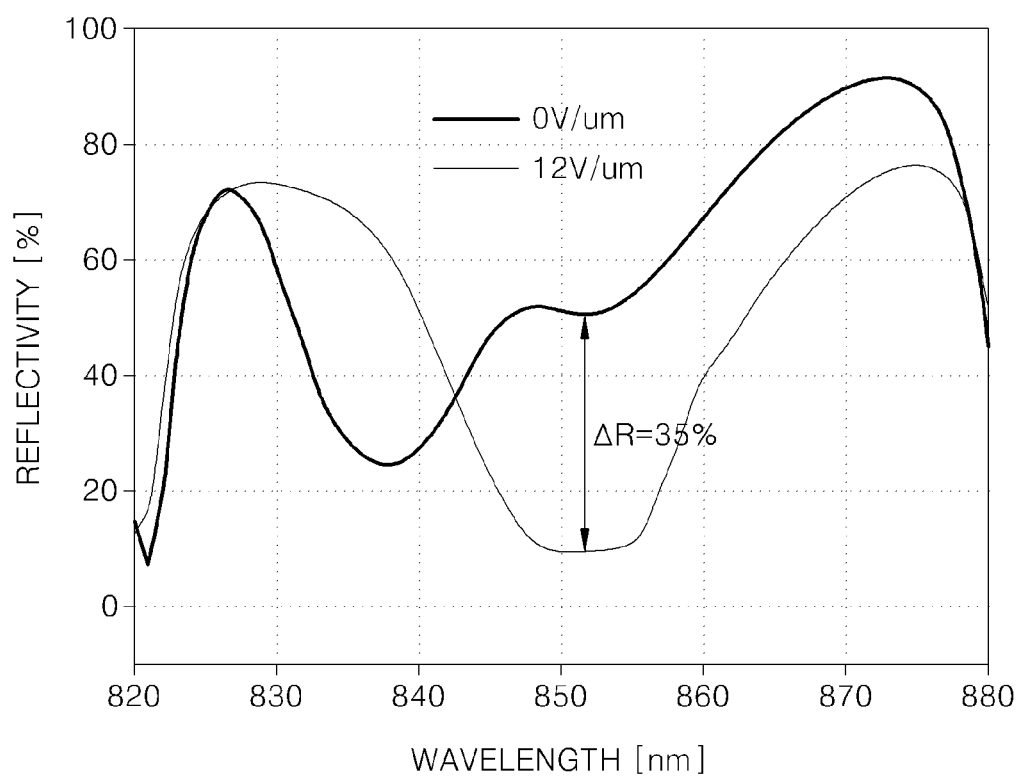
FIG. 4 is a graph showing characteristics of the optical modulator according to the exemplary embodiment of FIG. 3.

FIG. 4 is a graph showing characteristics of the exemplary optical modulator of FIG. 3. Referring to FIG. 4, when a reverse voltage is applied, reflectivity is relatively even in a section from about 847 to about 856 nm. Accordingly, the optical modulator 100 may operate stably regardless of manufacturing processes or an external environment such as temperature. Meanwhile, a bandwidth, in which a reflectivity difference between when the reverse voltage is applied and when the reverse voltage is not applied is more than about 30%, is about 13 nm in FIG. 4.

Figure 5:
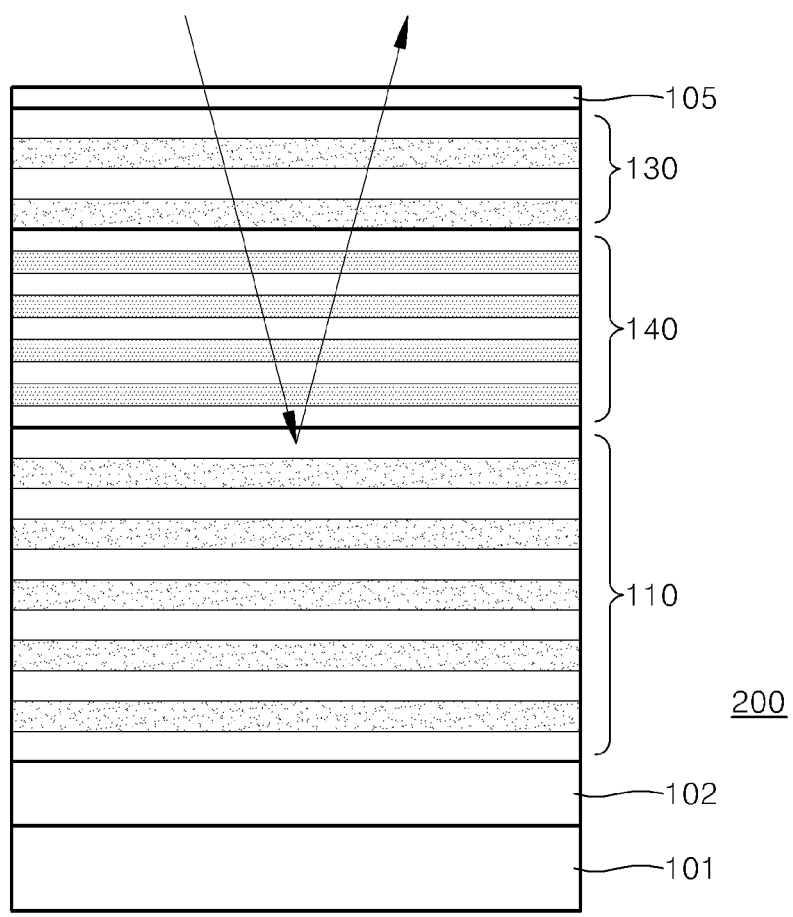
FIG. 5 is a cross-sectional view schematically illustrating an optical modulator according to another exemplary embodiment.

FIG. 5 is a cross-sectional view schematically illustrating an optical modulator 200 according to another exemplary embodiment. In the optical modulator 200, the first contact layer 102, the bottom DBR layer 110, an active layer 140, the top DBR layer 130, and the second contact layer 105 are sequentially disposed on the substrate 101 in the order stated. Comparing the optical modulator 200 with the optical modulator 100 of FIG. 1, the optical modulator 200 has the same structure as the optical modulator 100, except for the structure of the active layer 140. In other words, the top DBR layer 130 of the optical modulator 200 also includes a plurality of refractive index layers having different optical thicknesses. Moreover, the active layer 140 includes a plurality of quantum well layers having different optical thicknesses. Accordingly, the optical modulator 200 of FIG. 5 may be formed by changing the optical thicknesses of the quantum well layers in the active layer 120 of the optical modulator 100 of FIG. 1.

FIG. 6 is a table showing exemplary structures and thicknesses of layers of the optical modulator of FIG. 5, according to an exemplary embodiment. The optical modulator 200 according to the current exemplary embodiment is also designed to have a center absorption wavelength of about 850 nm by using a GaAs compound semiconductor.

Referring to FIG. 6, the second contact layer 105 formed of p-GaAs to operate as a p-contact layer is disposed on the top DBR layer 130. The thickness of the second contact layer 105 is 10 nm. The top DBR layer 130 is disposed below the second contact layer 105. The top DBR layer 130 has the structure as described with reference to FIG. 3, except for the number of pairs stacked in the first and second top DBR layers 131 and 133, and the thicknesses of the third and fourth refractive index layers 137 and 138 of the modified DBR layer 132. In other words, the exemplary embodiment illustrated in FIG. 3 does not include the first top DBR layer 131 but includes the second top DBR layer 133 including one pair of the first and second refractive index layers 135 and 136. In the exemplary embodiment illustrated in FIG. 6, however, the first top DBR layer 131 includes 10 pairs of the first and second refractive index layers 135 and 136, and the second top DBR layer 133 includes two pairs of the first and second refractive index layers 135 and 136. In addition, in the exemplary embodiment of FIG. 3, the thickness of the third refractive index layer 137 is about 77.55 nm and that of the fourth refractive index layer 138 is about 51.2 nm, but in the exemplary embodiment of FIG. 6, the thickness of the third refractive index layer 137 is about 42.2 nm and that of the fourth refractive index layer 138 is about 25.6 nm.

Meanwhile, the active layer 140 includes a first MQW 140a and a second MQW 140b having different thicknesses of quantum wells. For example, the first MQW 140a includes 17 pairs of a quantum well layer 147 having a thickness of 9 nm and formed of GaAs and a barrier layer 146 having a thickness of 3 nm and formed of AlAs. On the other hand, the second MQW 140b includes 17 pairs of a quantum well layer 145 having a thickness of 8 nm and formed of GaAs and a barrier layer 144 having a thickness of 3 nm and formed of AlAs. The second MQW 140b further includes a quantum well layer 143 having a thickness of 8 nm and formed of GaAs. The total thickness of the active layer 140 including the first and second MQW 140a and 140b is twice (2λ) the center absorption wavelength.

Generally, a light incident on an optical modulator is absorbed in a quantum well layer included in an active layer, and an absorbed wavelength is determined by a thickness of the quantum well layer. Electron-hole transition energy in the quantum well layer changes according to the thickness of the quantum well layer, and the change of the electron-hole transition energy means change of the absorbed wavelength. In the exemplary embodiment of FIG. 3, the active layer 120 includes the quantum well layer 123 having the thickness of 9 nm, but in the exemplary embodiment of FIG. 6, the active layer 140 includes the quantum well layer 147 having a thickness of 9 nm and the quantum well layers 143 and 145 each having thickness of 8 nm. Referring to FIG. 6, the quantum well layers 143, 145, and 147 having different thicknesses are divided into two portions, i.e., are individually included in the first and second MQWs 140a and 140b. However, the quantum well layer 147 having the thickness of 9 nm and the quantum well layers 143 and 145 each having the thickness of 8 nm may be alternatingly stacked on each other. In other words, the active layer 140 may be formed by repeatedly stacking a pair of the quantum well layer 147 having the thickness of 9 nm and the barrier layer 146, and a pair of the quantum well layer 145 having the thickness of 8 nm and the barrier layer 144.

A top cladding layer including an AlAs layer 148 and an $Al_{0.5}Ga_{0.5}As$ layer 149 is disposed between the top DBR layer 130 and the active layer 140, and a bottom cladding layer including an $Al_{0.5}Ga_{0.5}As$ layer 141 and an AlAs layer 142 is disposed between the active layer 140 and the bottom DBR layer 110. Also, the bottom DBR layer 110, the phase matching layer 111, the first contact layer 102, and the substrate 101 are sequentially disposed below the bottom cladding layer in the stated order. The structures and functions of the top and bottom cladding layers, the bottom DBR layer 110, the phase matching layer 111, the first contact layer 102, and the substrate 101 are identical to those described with reference to FIG. 3, and thus detailed descriptions thereof are not repeated.

Figure 7:
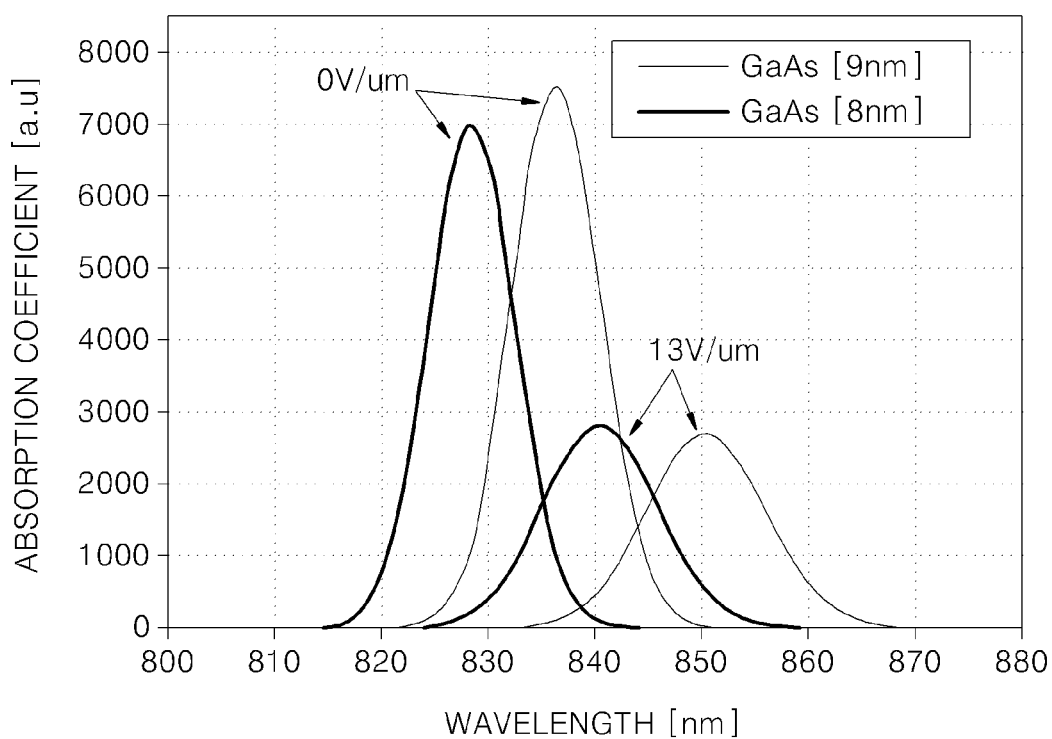
FIG. 7 is a graph showing an absorption coefficient with respect to an electric field of two quantum well layers having different thicknesses.
Figure 8:
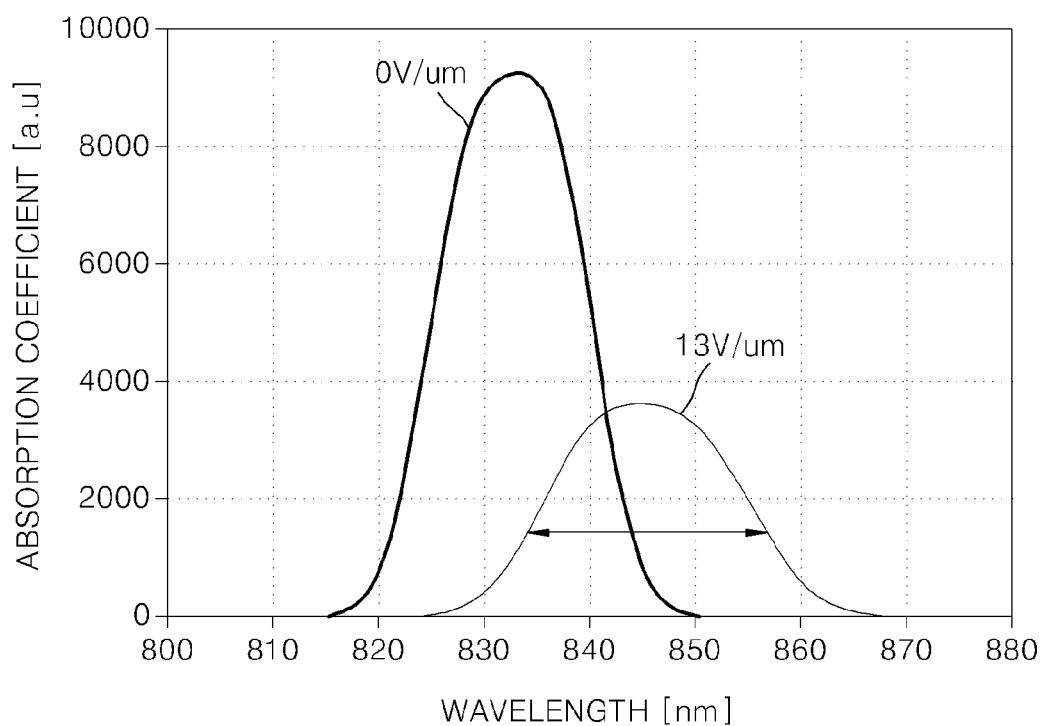
FIG. 8 is a graph showing an absorption coefficient with respect to an electric field, when two quantum well layers having different thicknesses are used in one active layer.
Figure 9:
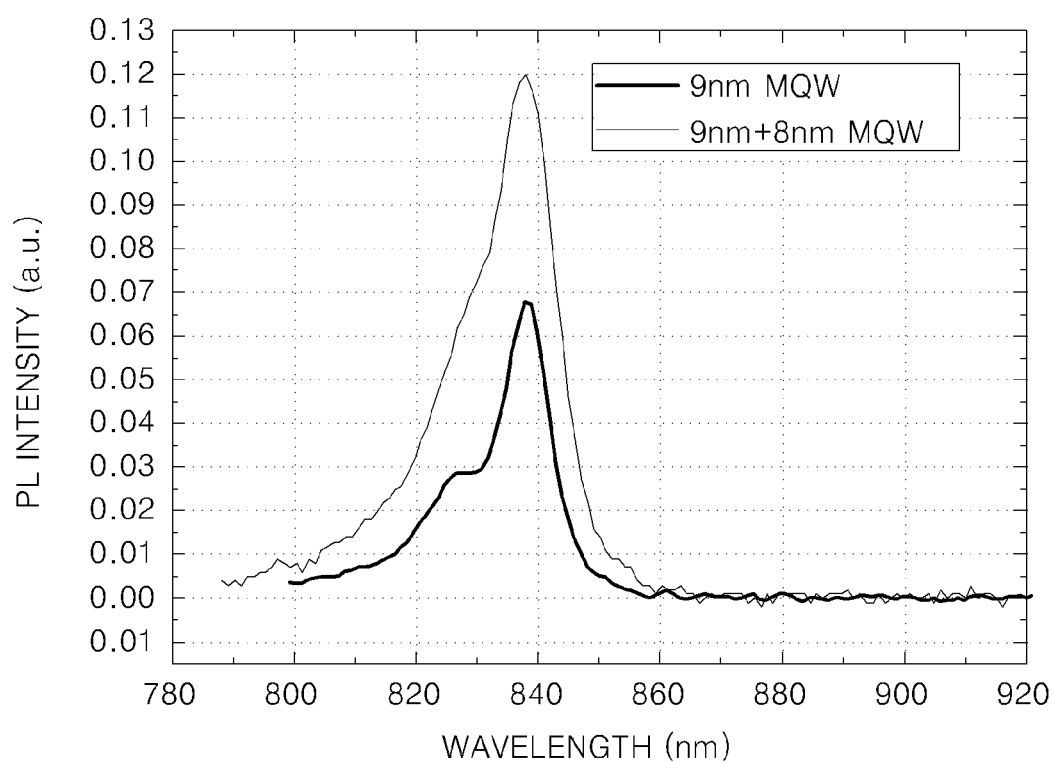
FIG. 9 is a graph showing a result of measuring actual photoluminescence (PL) bandwidths when only a quantum well layer having a thickness of 9 nm is used and when quantum well layers having thicknesses of 8 nm and 9 nm are used together.

FIG. 7 is a graph showing an absorption coefficient with respect to an electric field of two quantum well layers having different thicknesses. In FIG. 7, a term [a.u.] of a vertical axis means an arbitrary unit. The arbitrary unit is generally used when absolute values are not important while only relative values are significant. As shown in FIG. 7, a domain of an absorbed wavelength changes according to a thickness of a quantum well layer, and a degree of a long wavelength shift (Red-shift) of absorptivity when an electric field is applied also changes. For example, when a quantum well layer has a thickness of 8 nm, a center absorption wavelength moves to about 840 nm when an electric field of 13 V/μm is applied, but when a quantum well layer has a thickness of 9 nm, the center absorption wavelength moves to about 850 nm when the same electric field is applied. Accordingly, when the two quantum well layers respectively having the thicknesses of 8 nm and 9 nm are used together in one active layer, an incident light is absorbed in a wider bandwidth as shown in FIG. 8. FIG. 9 is a graph showing a result of measuring actual photoluminescence (PL) bandwidths when only the quantum well layer having a thickness of 9 nm is used (thick line) and when the quantum well layers having thicknesses of 8 nm and 9 nm are used together (thin line). As shown in FIG. 9, the bandwidth is larger when the quantum well layers having the thicknesses of 8 nm and 9 nm are used together than when only the quantum well layer having the thickness of 9 nm is used.

In FIGS. 7 and 8, when the absorbed wavelength is changed to a longer wavelength by applying the electric field, the absorption coefficient is reduced. However, it should be noted that, even though the absorption coefficient for the longer wavelength is reduced, the absorptivity for the longer wavelength can be increased if a resonant wavelength of the active layer 140 is coincident with the longer wavelength.

As described above, in the optical modulator 200 of FIG. 5, a light in a wider spectrum domain may be provided to the active layer 140 because the top DBR layer 130 partially has an optical thickness that is not λ/4. Also, the light may be absorbed in a wider bandwidth because the active layer 140 includes two types of quantum well layers having different thicknesses. Accordingly, when the top DBR layer 130 is used, a bandwidth in an active layer including two types of quantum well layers having different thicknesses is wider than that in an active layer including quantum well layers having the same thickness. Moreover, in the active layer including two types of quantum well layers having different thicknesses, the absorption bandwidth is increased but driving voltage and capacitance requirements are not increased.

Figure 10:
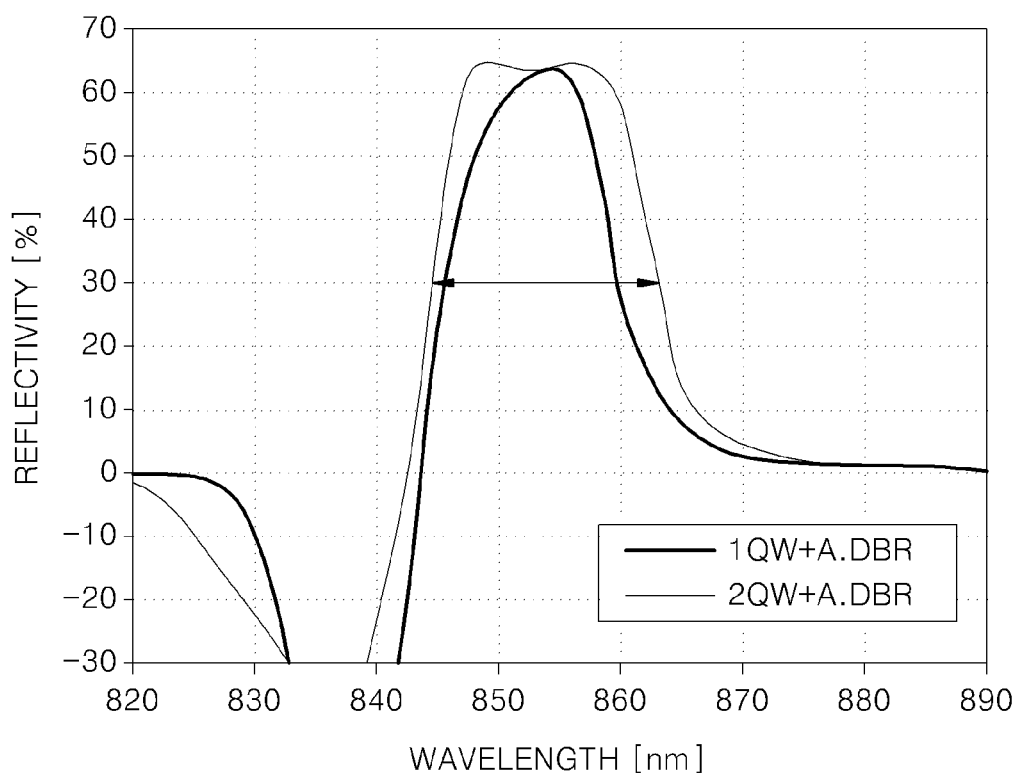
FIG. 10 is a graph showing reflectivity differences when an electric field is applied and not applied, with respect to an optical modulator including an active layer having one type of quantum well layer and a modified top DBR layer, and an optical modulator including an active layer having two types of quantum well layers and a modified top DBR layer.

FIG. 10 is a graph showing reflectivity differences (ΔR) when an electric field is applied and not applied, with respect to an optical modulator including the active layer 120 having one type of quantum well layer and the modified top DBR layer 132, and an optical modulator including the active layer 140 having two types of quantum well layers and the modified top DBR layer 132.

In FIG. 10, a thick line denotes a case of an optical modulator including one type of quantum well layer having a thickness of 9 nm like the optical modulator 100 of FIG. 3 and a structure of a top DBR layer like in the optical modulator 200 of FIG. 6. Meanwhile, a thin line denotes the optical modulator 200 of FIG. 6. In the above exemplary embodiments, the active layer 140 includes two types of quantum well layers having different thicknesses, but according to another exemplary embodiment, the active layer 140 may include at least three types of quantum well layers having different thicknesses.

In order to apply the optical modulator 100 or 200 that may be an AFPM on a 3D camera, the optical modulator 100 or 200 may need to have a large area, aside from the wide absorption bandwidth characteristics. However, when the size of an optical modulator is increased, the capacitance of the optical modulator may also be increased. Since the increase of the capacitance causes increase of a resistor-capacitor (RC) time constant of the optical modulator, the optical modulator may not be able to operate at a high speed from about 20 MHz to about 40 MHz. Accordingly, an electrode structure that increases the area of the optical modulator while decreasing the capacitance and sheet resistance may be needed.

FIGS. 11A through 11F are cross-sectional views for describing a method of manufacturing an optical modulator, according to an exemplary embodiment.

Figure 11A:
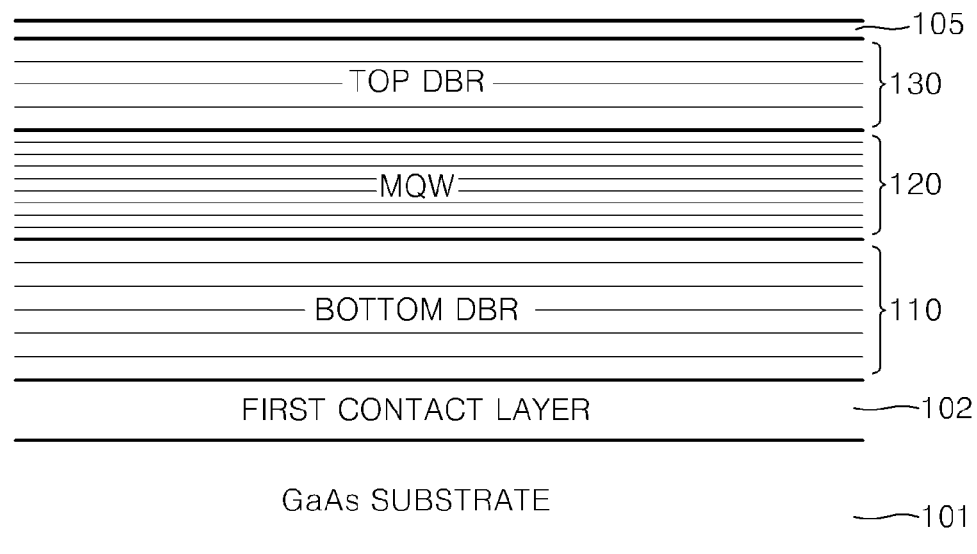
FIGS. 11A through 11F are cross-sectional views for describing a method of manufacturing an optical modulator, according to an exemplary embodiment.

First, referring to FIG. 11A, the first contact layer 102, the bottom DBR layer 110, the active layer 120, the top DBR layer 130, and the second contact layer 105 are sequentially stacked on the substrate 101 formed of GaAs in the stated order. Here, the structures, materials, and thicknesses of the substrate 101, the first contact layer 102, the bottom DBR layer 110, the active layer 120, the top DBR layer 130, and the second contact layer 105 may be as described with reference to FIG. 3. However, the structures shown in FIG. 3 are only exemplary embodiments, and thus may differ according to a center absorption wavelength and absorption bandwidth. The first contact layer 102, the bottom DBR layer 110, the active layer 120, the top DBR layer 130, and the second contact layer 105 may be formed by using any epitaxial growth method. Here, the first contact layer 102 may be an N-doped contact layer, and the second contact layer 105 may be a P-doped contact layer.

Figure 11B:
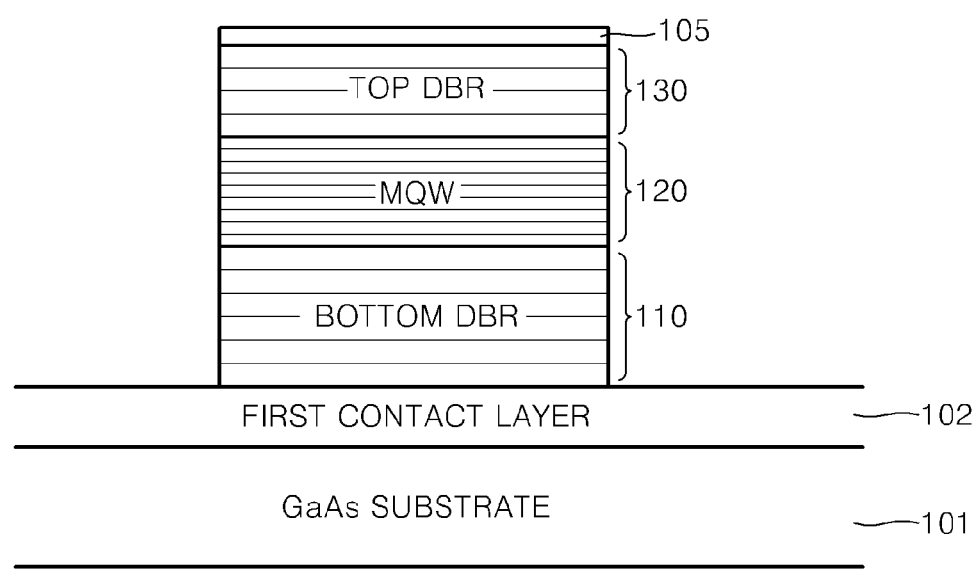

Then, referring to FIG. 11B, portions of the second contact layer 105, the top DBR layer 130, the active layer 120, and the bottom DBR layer 110 are consecutively etched by using a mesa etching method, until the top surface of the first contact layer 102 is exposed. Accordingly, the bottom DBR layer 110, the active layer 120, the top DBR layer 130, and the second contact layer 105 are left partially on the center area of the top surface of the first contact layer 102.

Figure 11C:
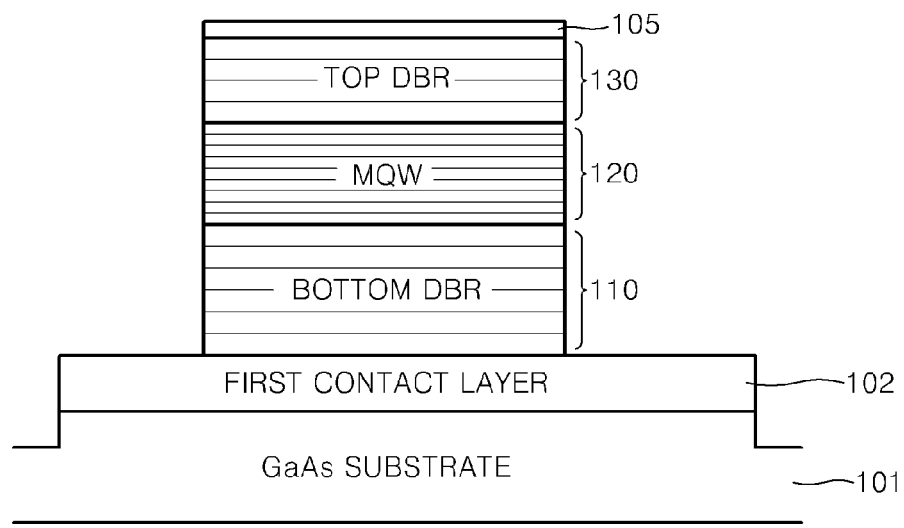
Figure 11D:
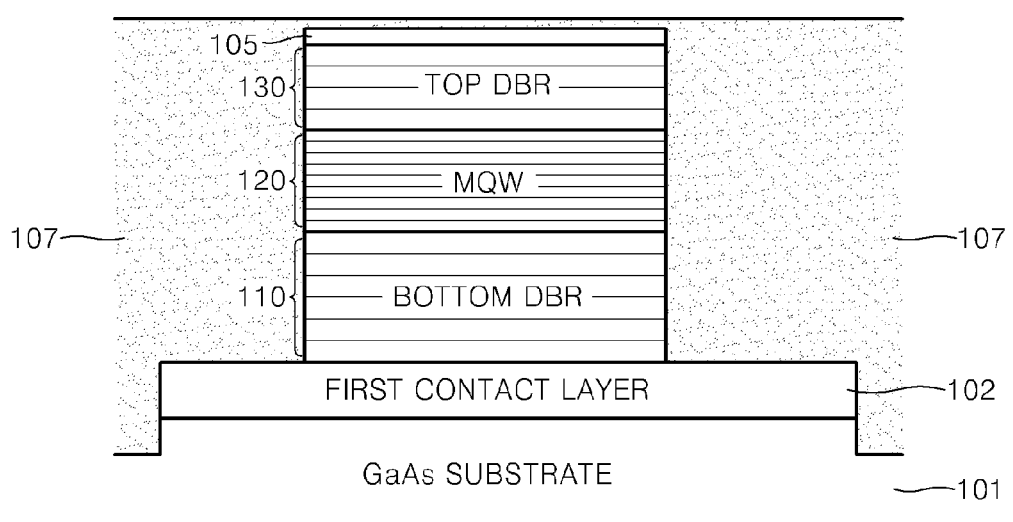

Then, as shown in FIG. 11C, portions of the first contact layer 102 are etched by using a mesa etching method until the top surface of the substrate 101 is exposed. At this point, portions of the substrate 101 are exposed, and these portions of the substrate 101 may be partially etched. Next, as shown in FIG. 11D, the portions removed by the mesa etching method are filled with an insulating layer 107. Here, the insulating layer 107 may have a uniform height, and the insulating layer 107 may cover the second contact layer 105. The insulating layer 107 may be formed of benzocylobutene (BCB).

Figure 11E:
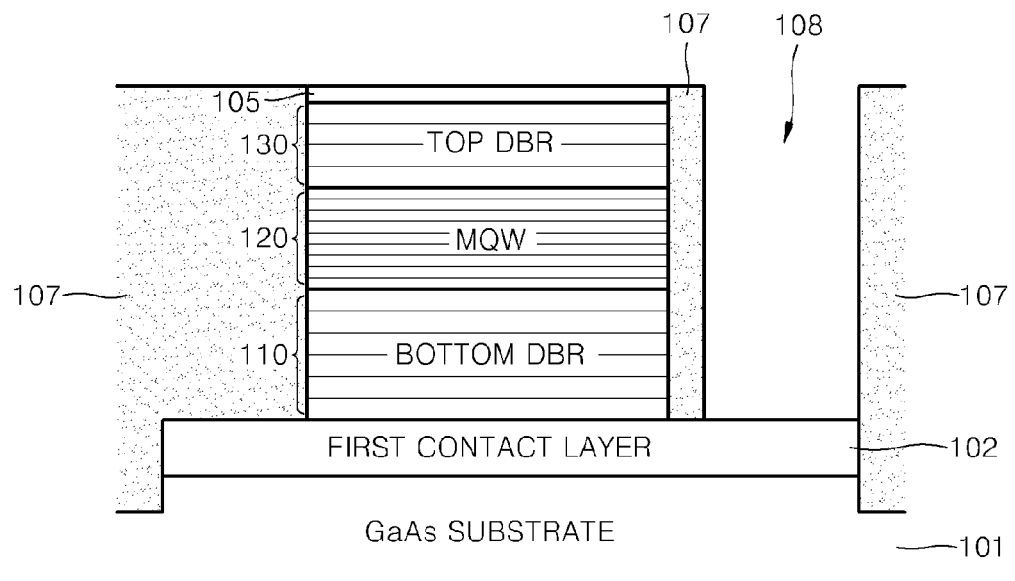

If the insulating layer 107 is covering second contact layer, FIG. 11E shows that the insulating layer 107 is partially removed until the second contact layer 105 is exposed by using a planarization method, such as chemical-mechanical planarization (CMP). Next, a trench 108 is formed in any one of the insulating layers 107 formed on both lateral sides of a structure including the bottom DBR layer 110, the active layer 120, the top DBR layer 130, and the second contact layer 105. While forming the trench 108, the surface of the first contact layer 102 may be exposed. Accordingly, the bottom surface of the trench 108 is the first contact layer 102.

Figure 11F:
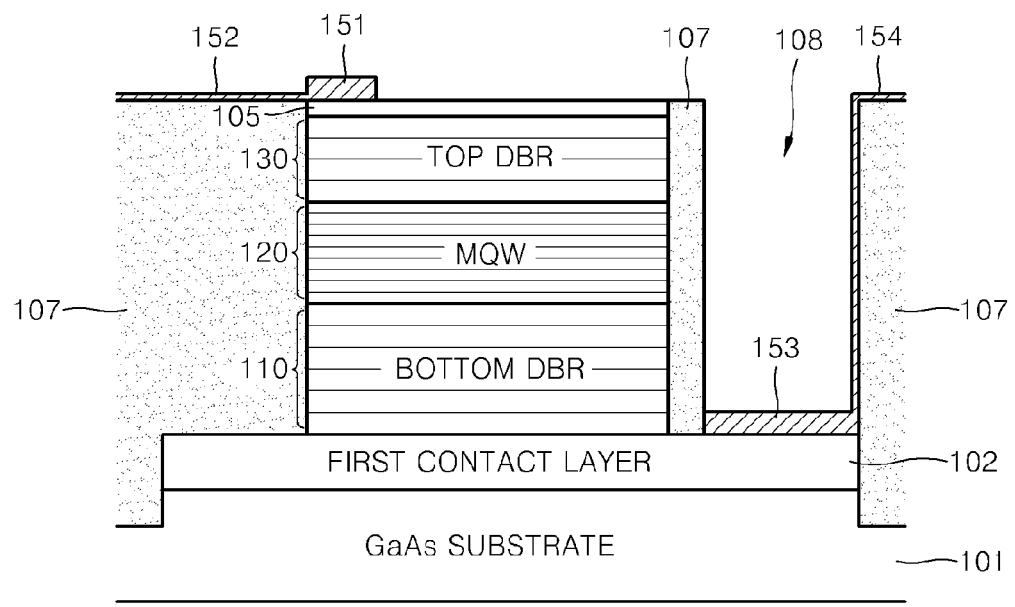

Finally, as shown in FIG. 11F, a first electrode 153 is formed on the entire surface of the first contact layer 102 exposed in the trench 108, and a second electrode 151 is partially formed on the surface of the second contact layer 105. When the first contact layer 102 is an N-type contact layer, the first electrode 153 may be formed of an N-type electrode material and the second electrode 151 may be formed of a P-type electrode material. A second metal wire 152 may be further formed on the surface of the insulating layer 107 to connect to the second electrode 151. Also, the first electrode 153 may be connected to a first metal wire 154 extending along the inner wall of the trench 108 to the surface of the insulating layer 107. According to such an electrode structure, the first and second electrodes 153 and 151 are disposed such that they do not face each other, and thus parasitic capacitance may be prevented from being generated.

Figure 12:
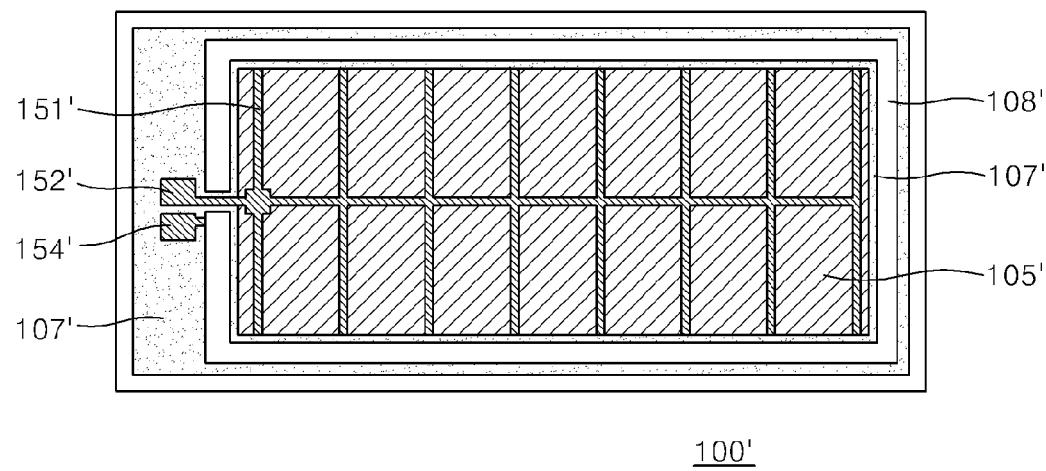
FIG. 12 is a plan view for describing an electrode connection structure of an optical modulator manufactured according to the method illustrated in FIGS. 11A through 11F.

FIG. 12 is a plan view for describing an electrode connection structure of the optical modulator 100' generally manufactured according to the method illustrated in FIGS. 11A through 11F, with some further modifications. Referring to FIG. 12, the insulating layer 107' is formed along the side circumference of the second contact layer 105' disposed on the top. In contrast to FIG. 11F, the trench 108' is formed along most of the entire circumference of the second contact layer 105' in the insulating layer 107', instead of being formed only at one side of the second contact layer 105 (FIG. 11F). The trench 108' may be narrow, having a width of about 20 μm. The first metal wire 154' connected to the first electrode (not shown) in the trench 108', and the second metal wire 152' connected to the second electrode 151' are disposed on a portion of a surface of the insulating layer 107'. The second electrode 151' is formed in a lattice shape on the top surface of the second contact layer 105'. Generally, the mobility of a hole is much lower than the mobility of an electron in the second contact layer 105' in the upper portion, sheet resistance may be 10 times higher than an N-electrode structure in the lower portion. Accordingly, the second electrode 151' having the lattice shape may be disposed on the entire second contact layer 105' so as to reduce the sheet resistance. Here, when the number of lattices of the second electrode 151' is increased, the sheet resistance is decreased but the light loss and capacitance may be increased. Accordingly, the number of the lattices may be determined considering the degree of decrease in the sheet resistance and the degree of increase in the light loss and capacitance.

Figure 13:
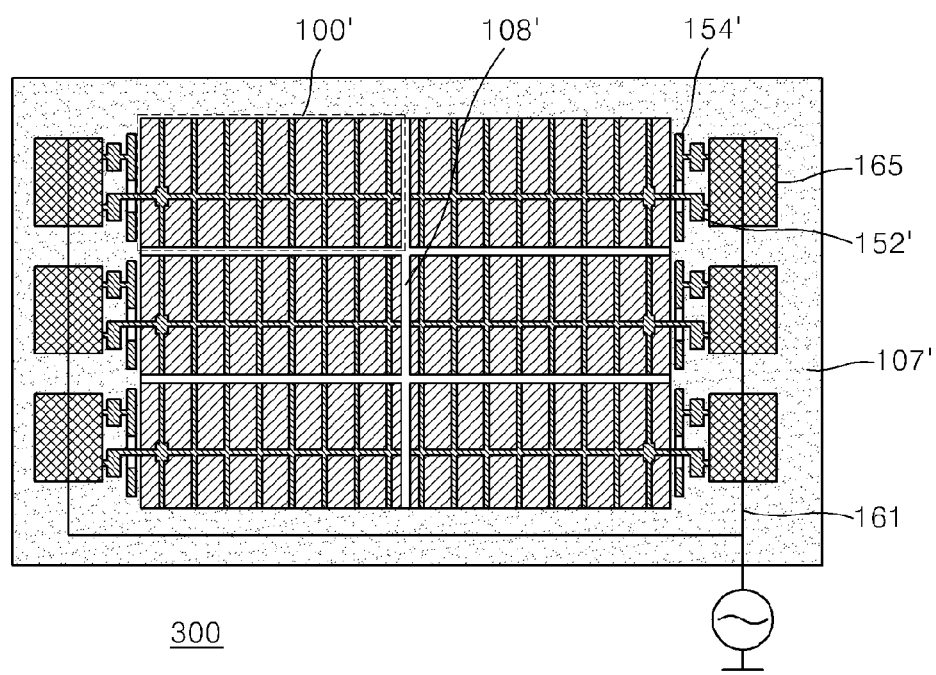
FIG. 13 is a diagram schematically illustrating an optical modulator device including a plurality of optical modulator cells, wherein the optical modulator of FIG. 12 is one cell, according to an exemplary embodiment.

Also, in order to decrease the capacitance more, the optical modulator 100' of FIG. 12 may be used as one optical modulator cell of a plurality of optical modulator cells to manufacture a large optical modulator device. FIG. 13 is a diagram schematically illustrating an optical modulator device 300 including the plurality of optical modulator cells according to an exemplary embodiment. In FIG. 13, the plurality of optical modulator cells are arranged in a 2×3 array. However, the arrangement of the plurality of optical modulator cells are not limited to the 2×3 array, and may be an n×m array, wherein n and m are each independently a natural number larger than 1, according to a design.

Referring to FIG. 13, one optical modulator 100' is separated from another optical modulator by the trench 108'. The width of the trench 108' may be from about 5 to about 10 μm. The each of the optical modulators include the first electrode and the second electrode 151' and the first and second metal wires 154' and 152', and also a driver 165 for driving the optical modulator. The driver 165 controls operations of the optical modulator according to control of a controller (not shown). For example, the driver 165 may supply a current from a power source line 161 to the optical modulator according to the control of the controller. The power source line 161 may be formed along the perimeter of the optical modulator device 300 along the surface of the insulating layer 107'.

So far, the optical modulator having a wide bandwidth based on Fabry-Perot resonant reflection is described in detail. In the exemplary embodiments, the optical modulator has a center absorption wavelength of 850 nm. However, the disclosed optical modulator is not limited thereto. For example, the optical modulator may have a center absorption wavelength in a range of 750-1000 nm when using a GaAs-based compound semiconductor. In another exemplary embodiment, the optical modulator may have a center absorption wavelength in a range of 800-950 nm.

Even though the above described optical modulator is a reflective type optical modulator, it is also possible to embody a transmissive type optical modulator based on the above description. For example, in the reflective type optical modulator, the reflectivity of the bottom DBR layer may be about 90-99% and the reflectivity of the top DBR layer may be about 40-50%. However, the transmissive type optical modulator may be configured in such a manner that the reflectivities of the bottom and top DBR layers are about 40-50%. That is to say, the top DBR layer of the reflective type optical modulator and the top DBR layer of the transmissive type optical modulator may have the same reflectivity and thus same structure. Therefore, the transmissive type optical modulator may also include the top DBR layer 130 including the first top DBR layer 131, the modified DBR layer 132, and the second top DBR layer 133. The transmissive type optical modulator is different from the reflective type optical modulator only in that the bottom DBR layer 110 is changed to have the reflectivity of about 40-50% and the GaAs substrate 101 is replaced with a transparent substrate such as a glass which is transmissive in a wavelength of about 750-1000 nm.

In the disclosed optical modulator having a wide bandwidth based on Fabry-Perot resonant reflection, reflectivity is evenly maintained with respect to a uniform optical wavelength section by differentiating thicknesses of a part of a plurality of refractive index layers included in a top DBR layer or thicknesses of a part of quantum well layers included in an active layer. Accordingly, the optical modulator maintains stable optical modulation characteristics even when a wavelength changes due to temperature or manufacturing process. The optical modulator may be used as a part of a unit for measuring a distance of an object in a 3-dimensional (3D) camera which may require a wide wavelength section from about 15 nm to 20 nm.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:

1. An optical modulator comprising:
   a bottom Distributed Bragg Reflector (DBR) layer;
   a top DBR layer comprising at least one layer, and a modified layer; and
   an active layer disposed between the bottom and the top DBR layers and comprising multiple quantum wells (MQW),
   wherein the at least one layer comprises at least one pair of a first refractive index layer having a first refractive index and a second refractive index layer having a second refractive index, each of the first and the second refractive index layers having a first optical thickness of $\lambda/4$ or an odd multiple thereof and the first and the second refractive indexes being different,
   wherein the modified layer comprises at least one pair of a third refractive index layer having a third refractive index and a fourth refractive index layer having a fourth refractive index, the third and the fourth refractive indexes being different, and
   wherein $\lambda$ is a center absorption wavelength in the active layer and at least one of the third and the fourth refractive index layers has a second optical thickness that is not $\lambda/4$ or that is not an odd multiple thereof.

2. The optical modulator of claim 1, wherein the first and the third refractive index layers comprise a same material and the first and the second optical thicknesses are different.

3. The optical modulator of claim 2, wherein the same material comprises AlAs.

4. The optical modulator of claim 1, wherein the second and the fourth refractive index layers comprise a same material and the first and the second optical thicknesses are different.

5. The optical modulator of claim 4, wherein the same material comprises $Al_xGa_{1-x}As$, x being an integer number.

6. The optical modulator of claim 1, wherein the first refractive index layer comprises a first refractive index material, and the third refractive index layer comprises a third refractive index material that is different from the first refractive index material.

7. The optical modulator of claim 6, wherein the first refractive index layer material comprises AlAs and the third refractive index layer material comprises $Al_{0.9}Ga_{0.1}As$.

8. The optical modulator of claim 1, wherein the second refractive index layer comprises a second refractive index layer material, and the fourth refractive index layer comprises a fourth refractive index layer material that is different from the second refractive index material.

9. The optical modulator of claim 8, wherein the second refractive index layer material comprises $Al_{0.5}Ga_{0.5}As$ and the fourth refractive index layer material comprises $Al_{0.3}Ga_{0.7}As$.

10. The optical modulator of claim 1, wherein the at least one layer of the top DBR layer comprises a first layer and a second layer, wherein the first layer is disposed on the modified layer and comprises at least one first pair of the first and the second refractive index layers, and the second layer is disposed below the modified layer and comprises at least one second pair of the first and the second refractive index layers.

11. The optical modulator of claim 10, wherein
the number of the at least one first pair is different from the number of the at least one second pair.

12. The optical modulator of claim 1, wherein the modified layer comprises a plurality of pairs of the third and fourth refractive index layers; and
wherein the at least one layer is disposed on the modified layer and comprises a plurality of pairs of the first and the second refractive index layers.

13. The optical modulator of claim 1, wherein the active layer comprises at least two types of quantum well layers having different thicknesses.

14. The optical modulator of claim 1, wherein the active layer comprises a first MQW and a second MQW which are stacked, wherein the first MQW comprises a plurality of pairs of a first quantum well layer and a first barrier layer, the second MQW comprises a plurality of pairs of a second quantum well layer and a second barrier layer, and the first and the second quantum well layers have different thicknesses.

15. The optical modulator of claim 14, wherein the first and the second quantum well layers comprise a same material.

16. The optical modulator of claim 15, wherein the same material comprises GaAs.

17. The optical modulator of claim 13, wherein a total thickness of the active layer is substantially identical to an integer multiple of the center absorption wavelength.

18. The optical modulator of claim 1, wherein the active layer comprises a structure in which a pair of a first quantum well layer and a first barrier layer and a pair of a second quantum well layer and a second barrier layer are stacked, wherein the first and the second quantum well layers comprise a same material and have different thicknesses.

19. The optical modulator of claim 1, further comprising:
a first contact layer disposed below the bottom DBR layer;
a substrate disposed below the first contact layer; and
a second contact layer disposed on the top DBR layer.

20. The optical modulator of claim 19, further comprising an electrode formed on the second contact layer, wherein the electrode has a lattice shape.

21. The optical modulator of claim 19, wherein the first contact layer is partially formed on a surface of the substrate, and the bottom DBR layer, the active layer, the top DBR layer, and the second contact layer are partially formed on a surface of the first contact layer.

22. The optical modulator of claim 21, further comprising an insulating layer disposed on the substrate and the first contact layer, at two sides of the bottom DBR layer, the active layer, the top DBR layer, and the second contact layer.

23. The optical modulator of claim 22, further comprising a trench which exposes the first contact layer from one of the insulating layers at two sides of the bottom DBR layer, the active layer, the top DBR layer, and the second contact layer.

24. The optical modulator of claim 23, further comprising:
an electrode formed on the first contact layer in the trench; and
a metal wire extending along an inner wall of the trench and a surface of the insulating layer, to be connected to the electrode.

25. The optical modulator of claim 1, wherein the bottom DBR layer is more reflective than the top DBR layer.

26. An optical modulator device comprising the optical modulator of claim 1 as an optical modulator cell of a plurality of optical modulator cells, wherein the plurality of optical modulator cells are arranged in an array.

27. The optical modulator device of claim 26, wherein the plurality of optical modulator cells are separated from an adjacent optical modulator cell by a trench.

28. The optical modulator device of claim 26, further comprising a plurality of drivers correspondingly disposed for the plurality of optical modulator cells.

29. An optical modulator comprising:
an active layer comprising multiple quantum wells;
a first Distributed Bragg Reflector (DBR) layer disposed to one side of the active layer; and
a second DBR layer disposed to another side of the active layer, the second DBR layer being less reflective than the first DBR layer,
wherein the second DBR layer comprises:
a first layer comprising a plurality of first refractive index layers and a plurality of second refractive index layers, the plurality of first refractive index layers being alternatingly disposed with the plurality of second refractive index layers;
a modified layer comprising at least one pair of layers; and
a second layer comprising another plurality of the first refractive index layers and another plurality of second refractive index layers, the another plurality of first refractive index layers being alternatingly disposed with the another plurality of second refractive index layers; and
wherein $\lambda$ is a center absorption wavelength in the active layer,
wherein each of the plurality of first refractive index layers and each of the plurality of second refractive index layers has an optical thickness of $\lambda/4$ or an odd multiple thereof, and
wherein the at least one pair of layers of the modified layer has an optical thickness that is not $\lambda/4$ or that is not an odd multiple thereof.

* * * * *